JOHN E. COX
EARL D. ANDERSON, Jr.
INVENTORS.

BY J. B. Burke
ATTORNEY.

United States Patent

[11] 3,624,294

[72] Inventors John E. Cox
West Milford Township, Passaic County;
Earl D. Anderson, Jr., Oakland, both of N.J.

[21] Appl. No. 809,738
[22] Filed Mar. 24, 1969
[45] Patented Nov. 30, 1971
[73] Assignee The Western Union Telegraph Company
New York, N.Y.

[54] DISTRIBUTED MULTIPLEXING OF LOW-SPEED TELEGRAPH SUBSCRIBER LINES
2 Claims, 3 Drawing Figs.

[52] U.S. Cl. .......... 178/50, 179/15 FD
[51] Int. Cl. .......... H04l 27/10
[50] Field of Search .......... 179/18.3 C, 27 A, 20 P, 2.5, 15; 178/50, 51, 61

[56] References Cited

UNITED STATES PATENTS

| | | | |
|---|---|---|---|
| 2,662,933 | 12/1953 | Singer .......... | 178/51 |
| 2,957,949 | 10/1960 | James et al. .......... | 179/18.3 C |
| 2,981,802 | 4/1961 | Lucas et al. .......... | 179/18.3 C |
| 2,820,097 | 1/1958 | Finlay .......... | 179/2.5 R |
| 3,462,554 | 8/1969 | Steel .......... | 179/15 R |
| 3,475,561 | 10/1969 | Krasin et al. .......... | 179/2.5 R |

OTHER REFERENCES

Transmission Systems for Communications, by members of the technical staff of Bell Telephone Laboratories, Copyright 1959, Vol. 1 pp. 5-1, 5-4 to 5-8

Amplitude Modulation Carrier Telegraph Systems, Lenkurt Electric Co. Inc. Bulletin 68A, Filed in the Patent Office Oct. 11, 1946. Pp. 3, 11, 14, 30

*Primary Examiner*—Kathleen H. Claffy
*Assistant Examiner*—David L. Stewart
*Attorney*—Michael I. Borsella

ABSTRACT: In a telegraph distribution system, a plurality of subscribers share a single voice-frequency channel on a multiplexed basis. Voice-frequency shift carrier modules are employed at each subscriber outstation. An AC mixing hub at a distribution point combines subscribers' data output on a single voice-frequency channel between the distribution point and a central office.

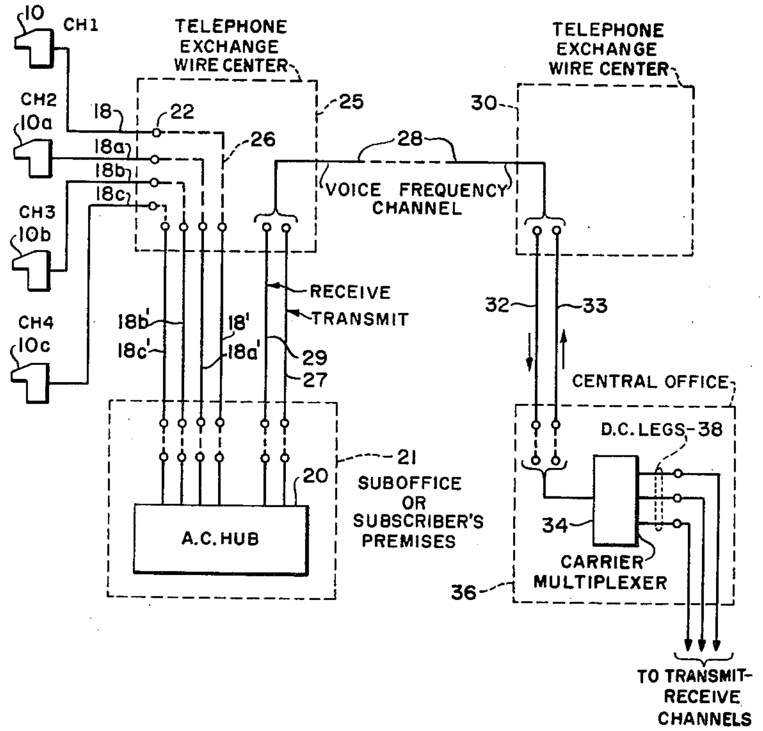

JOHN E. COX
EARL D. ANDERSON, Jr.
INVENTORS.

BY J. B. Burke
ATTORNEY.

DISTRIBUTED MULTIPLEXING OF LOW-SPEED TELEGRAPH SUBSCRIBER LINES

This invention concerns an improved communications system which permits several telegraph teleprinter service subscribers to share a single voice-frequency channel in communicating with a central office.

The distribution of telegraph and other pulse data above 75 bauds conventionally requires the use of a data loop transceiver and two separate cable pairs between each telegraph teleprinter subscriber and central office, or requires the use of telegraph carrier multiplexing over a voice-frequency channel when the distance range of the data loop transceiver is exceeded. The costs of leasing wire cable pairs for use by a single subscriber have become objectionably high, and the ratio of cost of leasing a cable pair to that of a voice-frequency channel have correspondingly increased.

The present invention provides a system whereby several telegraph service subscribers can share a single voice-frequency channel on a multiplexed basis without the need for a conventional telegraph carrier multiplex terminal at the distribution point. The system employs voice-frequency shift carrier modules at each subscriber outstation. Different subscribers use different telegraph channels. An AC mixing hub at the distribution point combines the subscribers' data output on a single voice-frequency channel between the distribution point and the telegraph central office. Here a carrier multiplexer extracts the subscribers' telegraph channels, i.e., different frequencies from the voice-frequency shift carrier modules, from the voice-frequency channel and presents them to the telegraph central office as standard DC legs.

The invention will be explained in further detail in connection with the drawing, wherein.

Figures 1, 2:
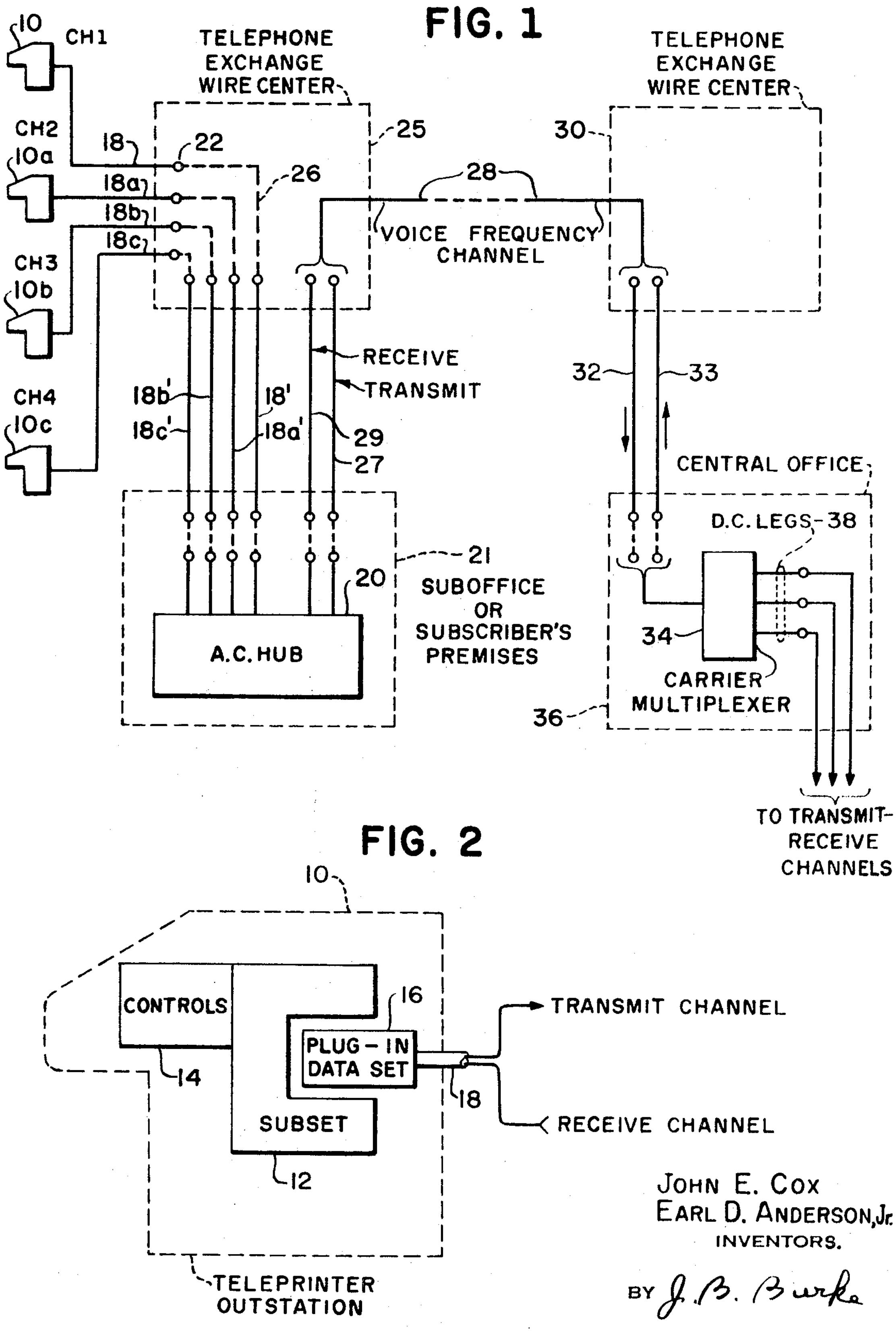
FIG. 1 is a diagram of a communications system embodying the invention.
FIG. 2 is a diagram of a subscriber's outstation.

Referring first to FIG. 2, there is shown a teleprinter outstation 10 which serves as a subscriber's outstation. The outstation has a control logic subset 12 operated by controls 14. A data plug-in set or modem 16 passes transmitted pulse signals and received pulse signals via a single wire cable pair 18 carrying separate receive and transmit channels.

FIG. 1 shows a plurality of similar subscribers' teleprinters 10, **10*a*, 10*b* and 10*c* provided with individual wire cable pairs 18, 18*a*, 18*b* and 18*c* which terminate at an AC hub 20. The cable pairs may be connected to terminals 22 in a telephone exchange wire center 25, where the cable pairs are connected by cross connections 26 to cable pairs 18', 18*a*', 18*b*' respectively, all of which terminate at the AC hub 20. The AC hub may be located at a suboffice 21, subscribers' premises or at the telephone exchange wire center. Cable pairs 27, 29 connect, transmit and receive channels of AC hub 20 to a voice-frequency channel 28 at the telephone exchange wire center 25. The voice-frequency channel terminates at a second telephone exchange wire center 30 from which two two-wire cables 32, 33 connect the voice frequency channel to a carrier multiplexer 34 at central distribution office 36. The multiplexer converts the analog channel signals into DC legs 38**. Two legs per channel are produced, one for the transmit direction and one for the receive direction.

Figure 3:
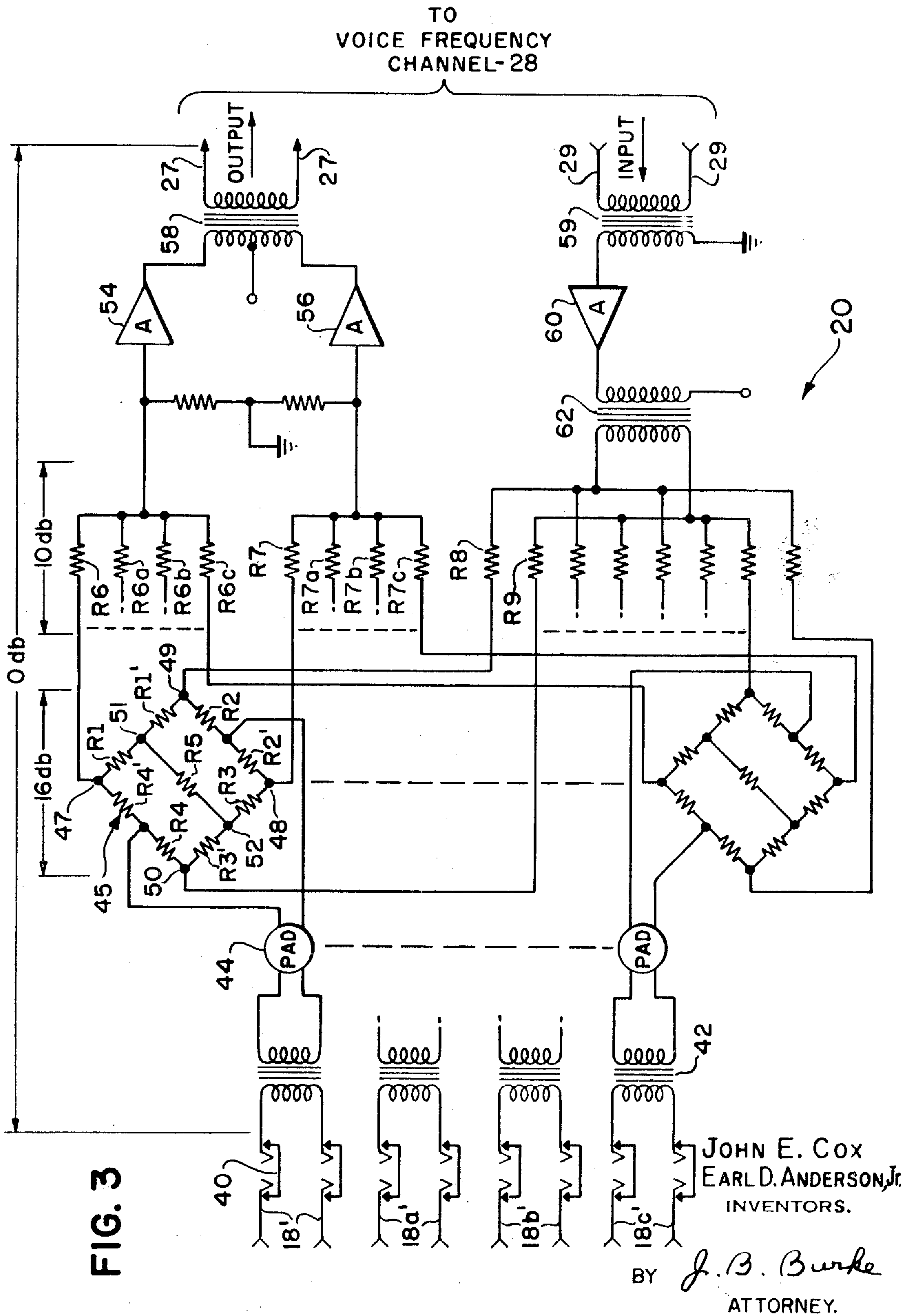
FIG. 3 is a diagram of an AC hub employed in the system.

FIG. 3 shows the circuitry of AC hub 20. Cable pairs or drops 18', **18*a*', 18*b*', 18*c*' from the subscribers' teleprinters 10, 10*a* and 10*b* are connected via line access test jacks 40 to individual input transformers 42. The transformers are connected via protective resistive pads 44 to resistive hybrid or bridges 45. The pad provides a minimum return loss for the hybrid balance. The transmit and receive channels are picked off opposite corners 47, 48 and 49, 50** of the bridge.

Each bridge has four resistive arms with two resistors R1,R1', R2,R2', R3,R3' and R4,R4' in each arm. Center points 51, 52 are connected via resistor R5. Inputs from four identical bridges 45 are mixed via isolating resistors R6, **R6*a*, R6*b*, R6*c*, and R7, R7*a*, R7*b*, R7*c* connected to bridge corners 47–50. The mixed inputs of the transmit channel are applied via amplifiers 54, 56 to output transformer 58 from which the mixed inputs are transmitted as a multiplexed telegraph signal group to voice-frequency channel 27**. This channel may be a voice-frequency telephone line.

The incoming received signals of voice-frequency channel 29 in the receive direction of four-wire voice-frequency channel 28 are applied via transformer 59, amplifier 60, isolating transformer 62, and isolating resistors R8, R9 to corners 49, 50 of the bridges.

All the cable drops receive all received telegraph channels which are applied to the plug-in data sets 16. Each plug-in data set is arranged to select its own received channel at the subscriber's teleprinter. The cable drops are all two-wire cable pairs which effects a considerable simplification in line-leasing costs and savings in equipment storage space, since the prior four-wire drops (two cable pairs) and data loop transceivers are eliminated.

The use of separate cable pairs 32, 33 as transmission and reception paths prevents singing between paths between the AC hub 20 and carrier multiplexer 34.

What is claimed is:

1. A telegraph distribution system for distributing to and from a distant multiplexer a plurality of transmit and receive telegraph data signals over a voice-frequency channel, the signals being associated with a plurality of subscriber stations wherein each of the stations includes means including a telegraph teleprinter for receiving telegraph signals and for arranging telegraph signals for transmission, wherein a local telephone exchange wire center is interposed in the circuit between the subscriber stations and the distant multiplexer, comprising in combination;

a plurality of voice-frequency shift carrier modules one at each of the subscriber stations for transmitting and receiving the telegraph signals associated with the stations over different voice-frequency telegraph channels;

a plurality of wire pairs wherein each pair is singularly connected at one end with one of the voice-frequency shift carrier modules and at the other end connected with the telephone exchange wire center for connecting each subscriber station with the telephone exchange wire center;

an AC mixing hub at the local telephone exchange wire center, including a plurality of resistive hybrid bridge circuits each singularly coupled through one of the wire pairs with each one of the voice-frequency shift carrier modules to carry the telegraph signals to and from each of the modules, a plurality of resistive elements wherein at least one is singularly connected in series with each of the hybrid circuits, an output circuit coupled with each of the bridge circuits through the resistive elements for combining the transmit data signals at the different telegraph channel frequencies, and an input circuit for applying mixed received telegraph data channel signals to the bridge circuits for carrying the received signals to each of the voice-frequency shift carrier modules at the subscriber stations;

a distant carrier multiplexer; and a voice-frequency channel connecting the AC mixing hub with the distant multiplexer, the voice-frequency channel including a first pair of wires for carrying the mixed transmit data signals from the output circuit of the AC hub to the distant multiplexer, and a second pair of wires for carrying the received telegraph signals from the distant multiplexer to the input circuit of the AC hub.

2. The distribution system of claim 1 wherein said output circuit includes a pair of push-pull coupled amplifiers coupled with said resistive bridge circuits through said resistive elements.

* * * * *